Aug. 31, 1937. R. C. WEISHAMPEL Re. 20,491

MACHINE FOR GRINDING TWIST DRILLS AND THE LIKE

Original Filed Jan. 20, 1931 5 Sheets-Sheet 1

INVENTOR
Robert C. Weishampel
BY P. Frank Jones
ATTORNEY

MACHINE FOR GRINDING TWIST DRILLS AND THE LIKE

Original Filed Jan. 20, 1931 5 Sheets-Sheet 2

INVENTOR
Robert C. Weishampel
BY
Frank Jornick
ATTORNEY

MACHINE FOR GRINDING TWIST DRILLS AND THE LIKE

Original Filed Jan. 20, 1931 5 Sheets-Sheet 3

INVENTOR
Robert C. Weishampel
BY
P. Frank Lomell
ATTORNEY

MACHINE FOR GRINDING TWIST DRILLS AND THE LIKE

Original Filed Jan. 20, 1931 5 Sheets-Sheet 4

INVENTOR
Robert C. Weishampel
BY
P. Frank Hornek
ATTORNEY

MACHINE FOR GRINDING TWIST DRILLS AND THE LIKE

Original Filed Jan. 20, 1931 5 Sheets-Sheet 5

INVENTOR
Robert C. Weishampel
BY
Frank Samuels
ATTORNEY

Reissued Aug. 31, 1937

Re. 20,491

UNITED STATES PATENT OFFICE 20,491

MACHINE FOR GRINDING TWIST DRILLS AND THE LIKE

Robert C. Weishampel, Paterson, N. J., assignor of two-thirds to Theophile J. Galipo, Paterson, N. J.

Original No. 1,989,835, dated February 5, 1935, Serial No. 509,900, January 20, 1931. Application for reissue February 2, 1937, Serial No. 123,718

18 Claims. (Cl. 51—219)

This invention relates generally to machine for grinding twist drills and the like and is more particularly directed to a mechanism for performing grinding operations, as in sharpening so-called twist drills and other cutting tools, or in shaping or polishing stock or manufactured parts.

While, as pointed out, my invention has a wide range of application I have elected to illustrate and describe it as it may be utilized in grinding or sharpening twist drills. It will be understood, however, that this is merely illustrative and does not constitute a limitation of my invention to this particular use, as it will be clearly evident as the description proceeds that the mode of operation of my mechanism renders it adaptable to the performance of other kinds of work, such as grinding straight drills, reamers, etc.

As is well known in the art, a drill, in order that it may render efficient service, must be accurately ground or sharpened. Both cutting lips must be inclined at the same angle with the axis of the drill, known as the cutting edge angle, and must be of equal length, while the drill point must have the proper receding surface contour back of the cutting edges, and the clearance afforded by this contour must be identical on both sides. The point or cutting edge angle which has been universally adopted as best suited for average working conditions is 59 degrees, while the clearance angle is fixed at approximately 12 degrees with a center angle of 130 degrees.

Numerous automatic, semi-automatic, or manually-actuated machines or mechanisms for performing the operations necessary to properly sharpen or grind twist drills have been devised. In some instances these machines or mechanisms are of a design which render their use more or less prohibitive from an economic standpoint, while in others the necessary accuracy in grinding cannot be assured, without frequent adjustments, and, in many cases, the introduction of supplementary hand operations.

Therefore, it is the primary object of this invention to provide a machine or mechanism which will possess those characteristics that it has been demonstrated are essential to overcome the objections raised to the prior art devices, so that the uncertainties of drill-grinding operations, with their concomitant production losses may be effectually eliminated, in a simple, practical and economical manner.

More specifically, my invention is directed to a preferred combination of a grinding element, such as an emery wheel, directly driven by a suitable power-generating element, or by remote means, and a, preferably, manually actuatable mechanism whereby the desired operations to be performed upon the work by the emery wheel may be accomplished by a combination of movements of said mechanism through predetermined paths or arcs and in different planes by a single continuing movement of the control element of the mechanism by the user of the machine.

Other objects and advantages flowing from the practicing of my invention will become apparent as the description proceeds, and I would have it understood that I reserve unto myself all rights to the full range of equivalents, both in structure and in use to which I may be entitled under my invention in its broadest aspect.

Figure 1:
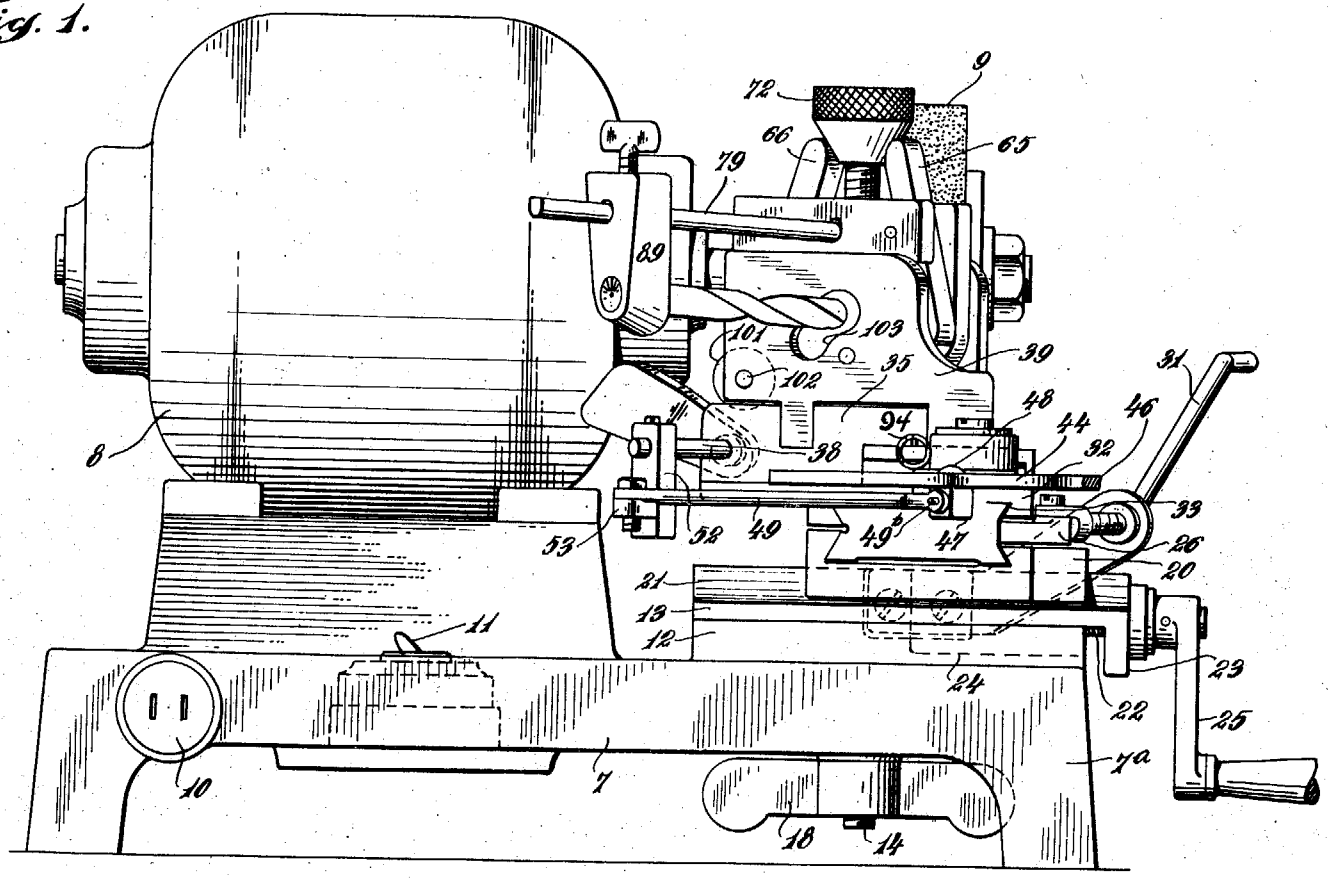
Figure 1 is a front elevation of a machine or mechanism of a portable type embodying my invention, showing a drill in position therein for the initiation of the grinding operation.
Figure 2:
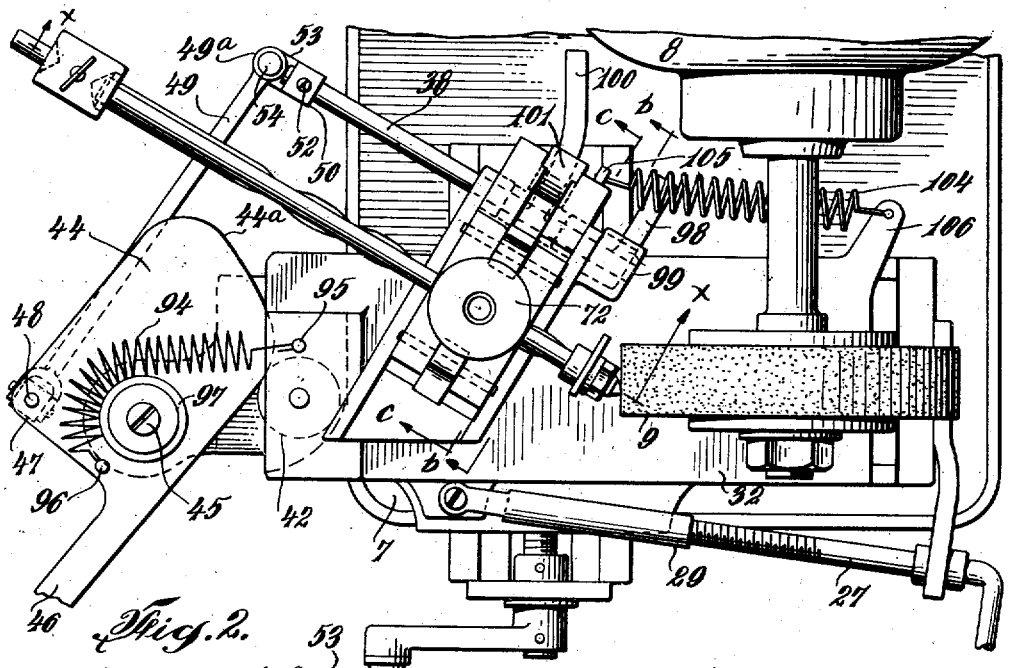
Figure 2 is a top plan view of a part of a structure shown in Figure 1, showing the position of the drill carrier relative to the periphery of the emery wheel in the first stage of the grinding operation.
Figure 3:
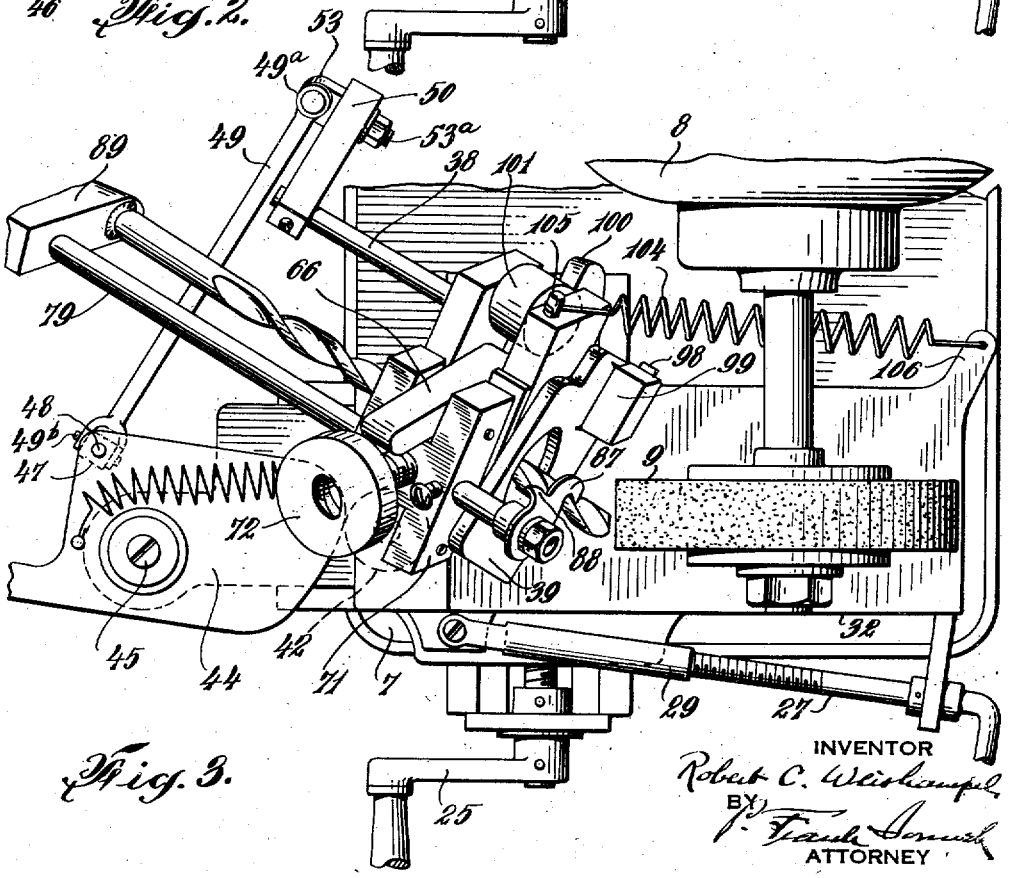
Figure 3 is a view similar to Figure 2 illustrating the relative positions of the components of the mechanism during sequential stages of the grinding operation.
Figure 4:
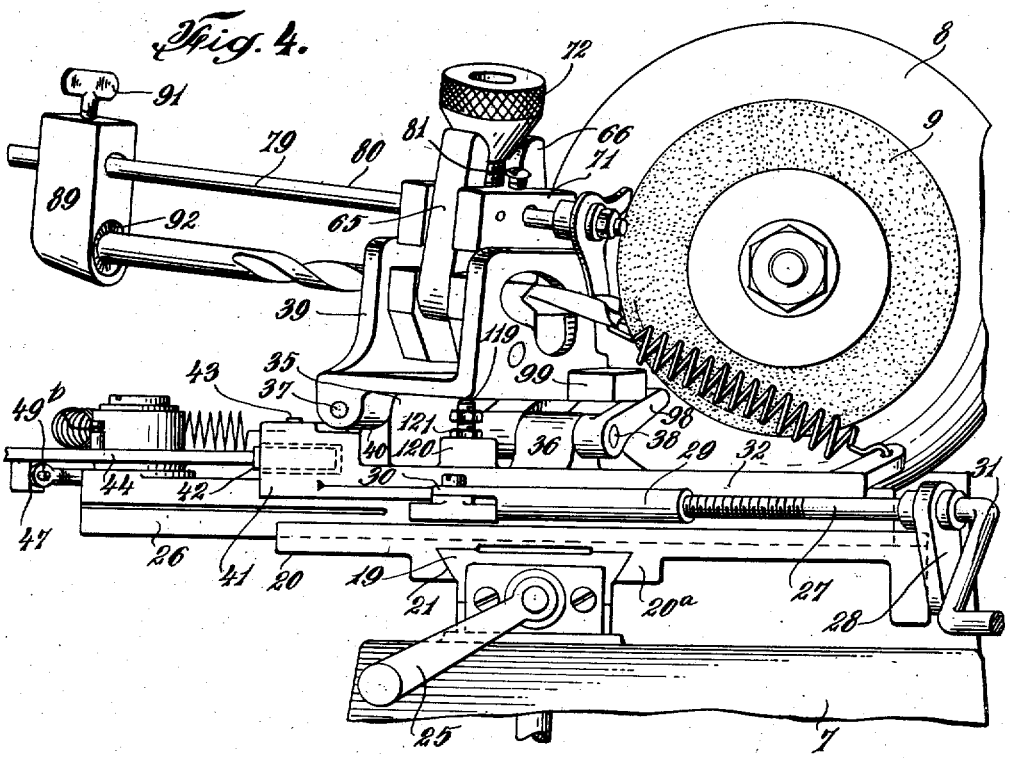
Figure 4 is a right hand side elevation of the structure shown in Figs. 1 to 3.
Figure 5:
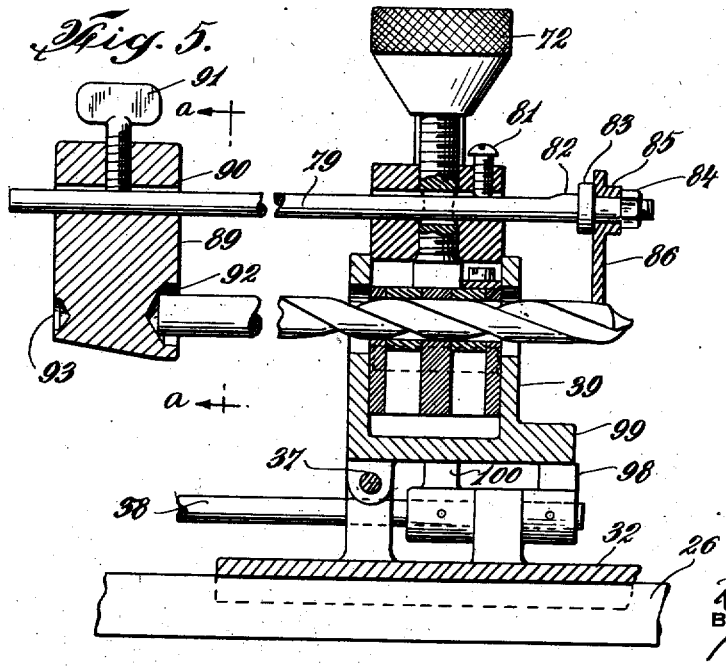
Figure 5 is a sectional detail of the work-clamping means of the carrier portion of the grinding mechanism or machine, on the line *x—x* of Figure 2.
Figure 6:
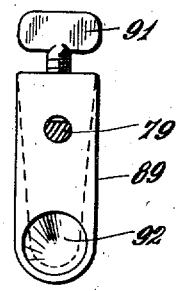
Figure 6 is a view in elevation of the adjustable work-holding element, looking in the direction of the arrows *a—a* of Figure 5.
Figure 9:
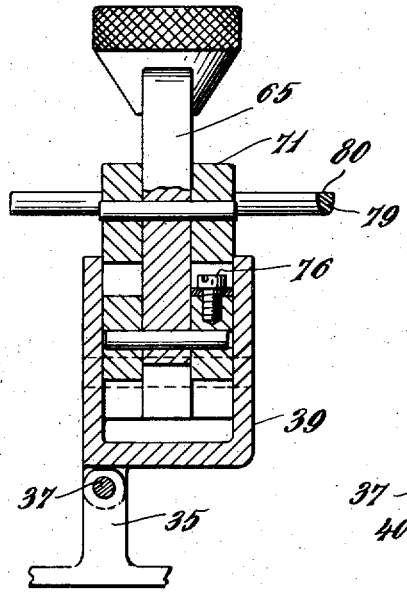
Figure 9 is a transverse section on the line *d—d* of Figure 7.
Figure 7:
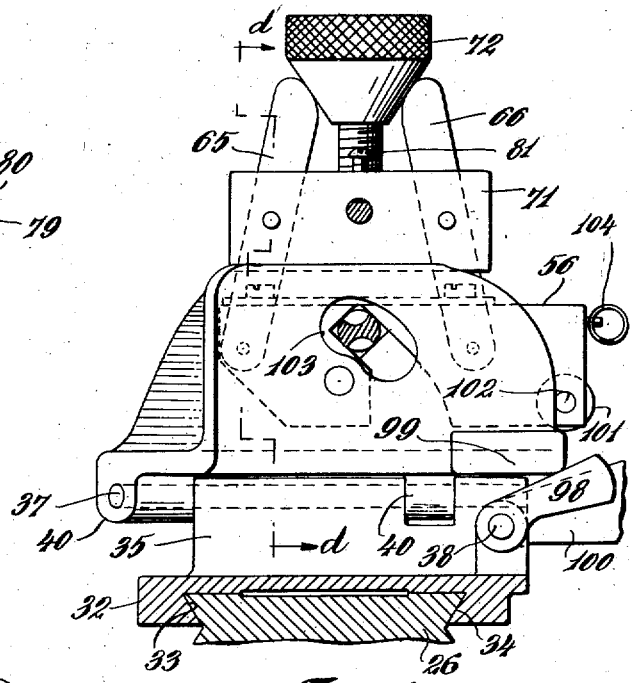
Figure 7 is an enlarged view of a portion of the work-supporting means taken on the line *b—b* of Figure 2.
Figure 10:
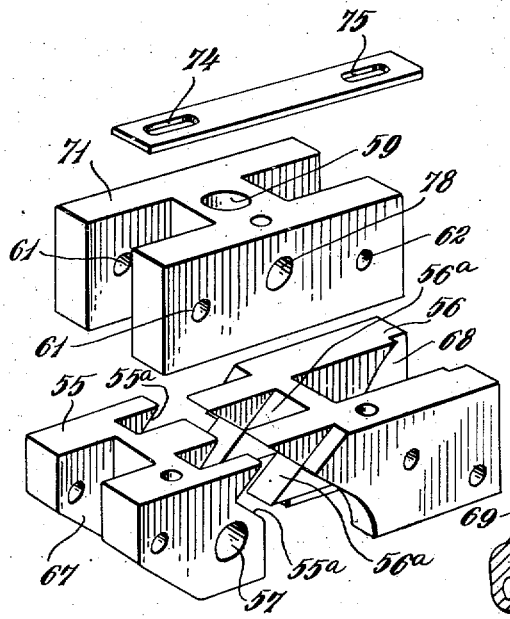
Figure 10 is a view in perspective of the disassociated elements which cooperate to form the adjustable work-holding means or clamp functioned by the operation of the conical nut shown in the preceding figures.
Figure 8:
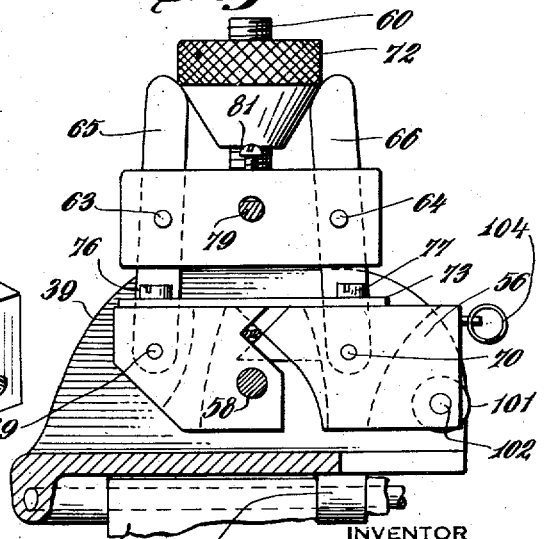
Figure 8 is a sectional view of the structure shown in Figure 7 taken through the line *c—c* of Figure 2.
Figure 11:
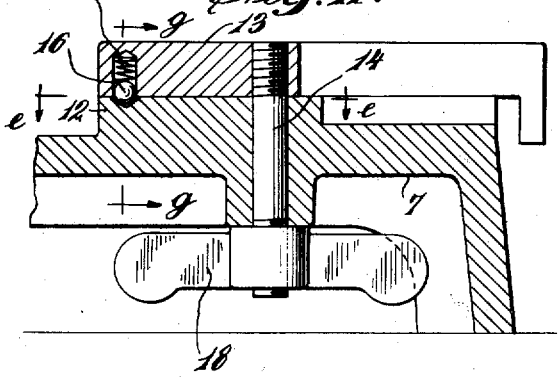
Figures 11 and 12 are sectional details of the positioning and locking means for maintaining predetermined adjustments of the slideway relative to its support, Figure 12 being a transverse view on the line *g—g* of Figure 11.
Figure 13:
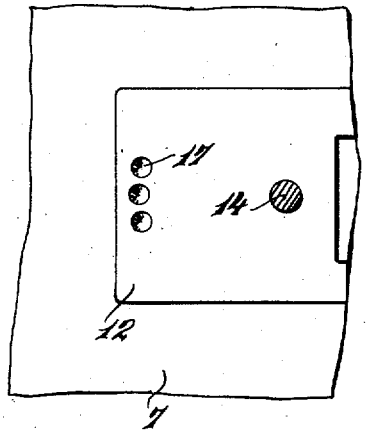
Figure 13 is a bottom plan view on the line *e—e* of Figure 11.
Figure 12:
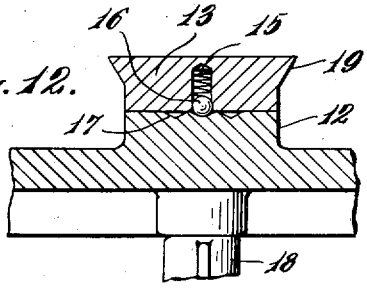

Referring now to the drawings in detail, in which like characters of reference are employed to designate similar parts in the several views, 7 indicates the bed or supporting frame of the machine or mechanism, preferably rectangular in shape, which may be provided with the usual standards or legs 7[a], the particular device shown being of the portable type, so that it may be transported from place to place for use wherever desired. This bed carries a suitably mounted electric motor 8 on the armature shaft of which is detachably mounted an emery wheel 9, the disposition of the motor being such that the emery wheel will be in advance of or normally spaced from the work-carrying mechanism as and for the purpose herein explained. Of course, as will be obvious, in the use of this machine, the emery wheel 9 may be removed from its supporting shaft and a polishing disc or wheel, or other element substituted therefor, and terms such as grinding wheel are intended to include any moving member capable of abrading or finishing the drill presented to it.

Suitable wiring to the receptacle 10 permits of the connection of the motor by means of the usual plug to a source of electric energy which may be controlled by a toggle or other form of switch, as shown at 11.

The aforesaid bed or frame 7 embodies a preferably integral pad 12 disposed transversely thereof which functions as a support or base for the superposed members to be described, including first a slideway 13 adjustably rotatable relatively to the pad on the axis of its holding screw 14. The slideway 13 is recessed adjacent one end, as at 15, to receive a spring actuated ball 16 that is adapted to register with a predetermined one of a series of semi-spherical seats or depressions 17 in the upper surface of the pad 12, it being apparent that as the slideway 13 is rotated on its aforesaid axis the ball in cooperation with one of said seats 17 will serve as a locating means in obtaining the desired angular adjustment of the slideway, the latter being securely locked in its adjusted position by means of the wing nut 18.

Supported upon the adjustable slideway 13 which is provided with suitable gibs 19 is the second adjustable member, in the form of a sideplate 20 formed with a thickened portion 20[a] having grooves or channels 21 adapted to register with said gibs to retain said sideplate 20 in slidable engagement with the aforesaid slideway 13. The lateral or right and left movement of said plate along said slideway is effected by means of the screw 22 supported in the apron 23 integral with the slideway 13 and meshing with the sleeve 24 dependent from the under side of said plate 20. The said screw 22 may be actuated by any suitable means as the crank indicated at 25.

Mounted upon the sideplate 20, in sliding engagement therewith, is a table 26, the movement of which longitudinally of the plate 20 or fore and aft is effected by means of a screw 27 supported in a bracket 28 fixed to the plate 20 in threaded engagement with the sleeve 29, pivoted to said table 26 as at 30, the said screw being actuated by means of a crank 31.

The slideway 13, sideplate 20 and table 26 are adjustably movable to bring the drill initially to proper adjacent relation to the grinder; the table constituting the under support for the operating members next described.

Supported upon the table 26, in slidable engagement therewith, is the first operating element in the form of a carrier or slide 32 channeled as at 33 to ride upon the complemental surfaces 34 of the table 26.

The second operating element is a cradle or rocker 39. The carrier 32 is formed with upwardly directed protuberant portions 35 and 36 which are bored to form journals for shafts 37 and 38, the former carrying and forming the axle of the cradle 39 which is provided with laterally spaced dependent ears 40 engaging said shaft. In juxtaposition to said protuberance 35 the carrier 32 is formed with an abutment 41 which is recessed to receive a roller 42 rotatable on the pin 43, this roller being adapted to be engaged by a cam 44 moving on the axis 45 and provided with an arm or extension 46 whereby it may be manually actuated as and for the purposes hereinafter explained.

Dependent from said cam 44 is a fitting 47 pivotally mounted on a pin 48, to which one end of a link 49 is connected for relative movement on an axis transverse of that of said pin, as indicated at 49[b], the other end of said link being connected to the fitting 50, fixed to the shaft 38 by means of the set screw 52, for relatively universal movement. As shown this latter connection includes a lug 53 mounted in the fitting 50 for rotation upon its axis 53[a], the bearing end 49[a] of the link 49 being pivoted to said lug by a screw or stud 54.

From the structure thus far described, it will be manifest that the sideplate 20, the table 26, and the carrier 32, may be adjusted laterally of the slideway 13 and that the latter is capable of a predetermined radial adjustment relative to the pad 12 which is a part of the supporting frame or base 7; also, that the table 26 is capable of adjustment longitudinally of the sideplate 20, by the actuation of the screw 27.

The cradle 39, which comprises a base portion and upwardly projecting sides, in combination with suitable clamping elements 55—56 carried by it and means for functioning the latter, constitutes the work-holding portion of the mechanism operating upon the carrier 32. The clamping elements consist of two jaw members 55 and 56, formed with opposed registering and interengaging inclined surfaces, generally indicated at 55[a] and 56[a], the member 55 being apertured at 57 to receive a pin 58, mounted in the opposite side walls of said cradle.

Thus the clamp 55—56 is the third or final operating element. Its details are shown as follows. Supported from the top of the cradle is an H-shaped member 71 having a vertically disposed bore 59 extending through its transverse wall to receive a screw 60, which may be nonrotatably fastened therein by any suitable means. The opposed side walls of said member are respectively apertured at 61 and 62 to receive the pins 63 and 64 which carry arms or levers 65 and 66, the lower ends of which are located within the slots 67 and 68 of the members 55 and 56 for pivotal connection thereto by pins 69 and 70. Thus, it will be seen that as the conical nut 72 is turned down upon the screw 60 the ends of the arms 65 and 66, which are shaped for surface contact with said nut, are urged outwardly, causing the clamping elements 55 and 56 to approach each other so as to render their work-engaging surfaces or jaws effective upon the work as hereinafter explained, the said elements being maintained in cooperative alignment by the plate 73 provided with elongated slots at 74 and 75 which ride upon the screws 76 and 77, seated respectively in the clamping elements 55 and 56. Of course, the movement of the nut 72 in the reverse direction will permit the clamping elements to recede from each other.

A horizontal bore 78, extending centrally through the H-shaped member 71, is adapted to receive a rod 79, the upper surface of which is flat as shown at 80, the said rod being locked in said bore by means of the set screw 81. This rod is provided adjacent one end with a shoulder 82 to form a stop for a collar 83 between which and the nut 84, threaded on the end of said rod 79, the hub 85 of a dog 86 is mounted for rotative movement, the said dog having a nose or projection 87, adapted to engage a surface of the work and a finger-piece 88 whereby it may be moved into and out of functioning position. A block 89, provided with a horizontal bore adjacent its upper end, is slidably mounted upon said rod 79, and is adapted to be locked in adjusted position by the thumb screw 91. This block is preferably provided with tapered cavities or recesses of different diameters and depths in its opposite faces, as indicated at 92 and 93, respectively. These cavities are designed to provide seats which are adapted to engage the end of the piece of work which is held between the clamping elements 55 and 56, it being obvious that the position of the block 89 on the rod 79 may be reversed so that the block may satisfactorily function with stock or work having different diameters.

To grind or sharpen a drill, it is inserted between the opposed jaws of the drill holder or clamping elements 55 and 56 with its point in advance of the dog 86, and the nose 87 thereof, which is notched for the purpose, is engaged with the spiral defining the upturned groove of the drill, the nut 72 having, in the meantime, been actuated just enough to retain the drill in set position between the clamping elements. The block 89 is now pressed hard against the end of the shank of the drill, which seats itself in the cavity 92, so that the drill is thus accurately lined up from cutting point to end and true to its diameter. The nut 72 is now turned to complete the clamping operation of the jaw members 55 and 56, the drill, as will be noted from the drawings, being rigidly supported thereby at a plurality of longitudinally spaced parts of its length.

When the drill has been properly located in the work-holder the table 26 is adjusted longitudinally of the plate 20 by the actuation of the screw 27 to bring the drill point into the proper proximity to the periphery of the emery wheel 9. Also, the screw 22 may be operated, if necessary, to adjust the drill across and thus protect the emery wheel against grooving or undue wear, it being apparent that if the mechanism was not adjustable transversely of the emery wheel, the effective life of the latter would be of short duration.

With the emery wheel rotating, the grinding operation may now be performed by the operator grasping the actuator arm or handle 46 of the cam plate 44 and moving it to the left, which by the timed connections causes the cooperative movements of the carrier, cradle and clamp. Thus first it causes the cam surface 44a, in engagement with the roller 42 to urge the carrier 32, with its supported elements rearward toward the revolving emery wheel, in opposition to the spring 94 fixed to said carrier at 95 and to said cam plate at 96, the said spring bending about the roller or hub 97 to vary its effectiveness.

Simultaneously with the functioning of the cam plate 44, and in properly timed sequence, the cam 98 fixed to the shaft 38 in engagement with the toe 99 projecting from the cradle 39 initiates a swinging or arcuate rocking movement of the cradle 39 on its shaft 37; while the cam 100, likewise fixed to the shaft 38, and curved longitudinally to enter the slot 68 of the clamping element 56, traverses the roller 101 mounted within said slot 68 on a pin 102, to swing or turn said clamping elements, with the drill, on the pin 58, the drill riding within the elongated arcuate slots 103 provided in the opposite side walls of the cradle 39. The movement of the cradle on its slanting axis 37 and of the work-clamping unit on its oppositely slanting axis 58 are effected by the respective cams 98 and 101 in opposition to the spring 104, one end of which is fixed to the clamping element 56 as at 105, while the other end is attached to a laterally extending lug 106 on the carrier 32. At the conclusion of the movements of the carrier, cradle, and work-holder just described, produced by the single continuing movement of the cam plate 44, the latter is actuated in reverse direction which, obviously, effects a reversal of the sequence of movements of the several parts actuated by the cams 100, 98, and 44a. With the drill pressed upon the grinder these movements may be repeated until the grinding is done. When one lip of the drill has been operated upon, the nut 72 is slightly loosened to permit the position of the drill to be changed in the work-holder so that the other lip may be sharpened, the nut 72 again being tightened when the drill has been adjusted to its new position and the grinding operation performed as hereinbefore described.

As will be noted, the cradle 39 is normally supported in advance of its line of axial movement by a screw 119 which is threaded in the boss 120 on the carrier 32 to provide for such vertical adjustment of the cradle as may be necessary, in properly locating the work relative to the emery wheel 9 or other element, the screw being locked in position by the nut 121.

The general combination of this invention and the disclosed operation thereof have been indicated but may be advantageously reviewed as follows. Certain underneath elements provide initial adjustments for each drill or batch of drills, and, when so adjusted, other parts provide the operative or grinding movements. The adjustments are made by the slideway 13 rotatable on the underneath pad or base 12, the slideplate 20 slidable laterally or right and left on the slideway 13, and the table 26 slidable longitudinally or frontwardly and backwardly on the slideplate; these being adjusting movements to bring the drill initially in proper relation to a selected part of the face of the grinder wheel.

The elements or members which operate during each grinding are supported above the table 26 which therefore acts as an under support. The carrier or slide 32 is mounted on the table to advance rearwardly toward the grinder, thus to bring the work or drill to and press it against the grinding face. On the carrier is the cradle or rocker 39; this being mounted to tilt during the grinding, and thereby to tilt the drill, about a slanting axis, preferably about 31° to the grinding face for the grinding of conventional twist drills. The clamp, work holder or chuck 55—56 is mounted on the cradle in a manner to swing or rotate during grinding, and thus turn the drill about a slanting axis different from the axis of the cradle and at an opposite slant, preferably at right angles, that is, to hold the drill at about 59° to the grinding face, this angle representing the cutting-edge-angle of the conventional twist drill. These operative elements, the carrier, the cradle and the clamp, are given their described movements cooperatively by a single throw of an actuator, operating lever 46 or other manual device. With timed connections from the actuator the operating elements go through their coordinated movements as necessary. By the advance of the carrier toward the grinder the drill is brought to the grinding face and pressed against it. While so pressed the rocking of the cradle puts the drill through its rocking movements, while simultaneously the swinging of the clamp causes the turning of the drill. These pressing, rocking and turning movements, at the proper angles serve to grind the drill with a suitable cutting-edge-angle, preferably about 59°, the drilling contour being formed also with a suitable or conventional clearance angle as of about 12°.

I have found from actual practice that, by the employment of my invention as herein set forth, I am enabled to obtain absolute accuracy in the grinding or sharpening of a drill, the sequential movements of the carrier, the cradle, and the chuck or clamping element producing a drill point which corresponds in every particular to the specifications which are universally recognized as being essential in a correctly pointed drill as hereinbefore set forth, it being understood, of course, that my mechanism possesses a sufficient range of adjustability to produce any desired variables from the standard specifications.

Figure 15:
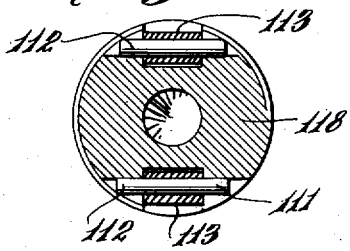
Figure 15 is a transverse section on the line *f—f* of Figure 14.
Figure 14:
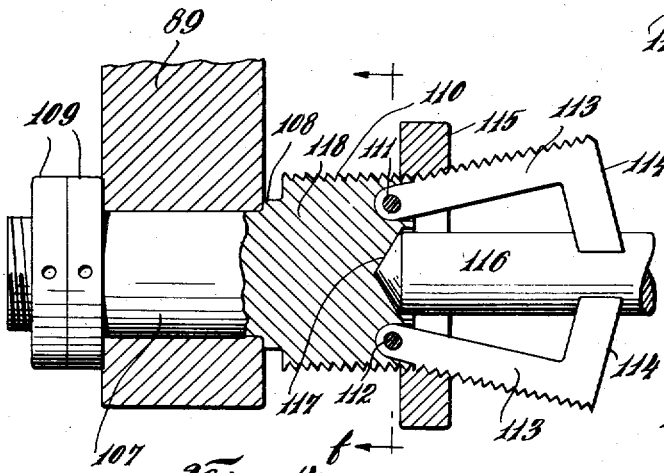
Figure 14 is a view partly in section of a modified form of chuck or means for engaging the shank end of a drill or other piece of work supported in the carrier frame.
Figure 16:
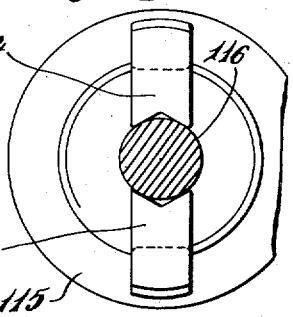
Figure 16 is a view in elevation looking from the right of Figure 14.

While I have described my invention with particular reference to the embodiment herein illustrated, it will be manifest that various changes in providing the necessary adjustments of the sideplate 20, the table 26, and the carrier 32, relative to each other and with relation to the slideway 13, and of the latter with respect to the pad 12 or supporting frame 7, for angular variations, may be made to conform to production or other requirements. Also, the means for holding the work in position for the grinding or other operation and the location of the actuating cams, and their method of functioning may be changed within the purview of the claims and without departing from the spirit and scope of this invention. As an example, in lieu of the block 89 with its recesses 92 and 93, this block or a similar one suspended from the rod 79 may be apertured, as Figs. 14 to 16 show, to receive the reduced end of a fitting 107 having a shoulder 108 whereby said fitting may be locked to said block by the collars 109 in threaded engagement with the protruding end of said reduced portion 107, the said fitting embodying a threaded hub 110 in which is pivoted at 111 and 112 a pair of arms 113 having angular portions 114, the extremities of which are recessed as shown in Figure 16. These arms 113 are peripherally threaded for engagement with the internal threads of the collar 115 and, as will be obvious from Figure 14, the said arms are adapted to exert clamping effort upon the work 116, positioned in the cavity 117 in said hub, as the collar 115 is actuated upon the arms in the direction of their free ends. The inward movement of the collar, of course, onto the hub 118 relieves the arms of pressure and permits of the disengagement of the work therefrom.

I claim:

1. In combination with an emery wheel or the like, a mechanism for supporting a drill or similar work in position for grinding to a predetermined contour by said emery wheel, said mechanism embodying means for effecting the adjustment thereof in paths respectively parallel to and intersecting the axis of said emery wheel, a work-holding cradle rockable on an axis inclined to the face of the emery wheel, a work clamp swingably connected to said cradle for movement on an axis intersecting the axis of said cradle and means operable, by a single continuing movement, to move said work-holding cradle bodily towards said emery wheel and in sequence to rock said cradle and to swing said clamp on their respective aforesaid axes, said operating means including a hand-actuatable cam, a shaft connected thereto and a pair of cams on said shaft for respectively actuating said cradle and said clamp.

2. A grinding machine, embodying a bed, a rotatable grinder mounted thereon and a mechanism for supporting a drill or similar work in the performance of a grinding operation, said mechanism including a slideway, a sideplate adjustable longitudinally of said slideway, a table slidably movable along said plate, a carrier adjustable longitudinally laterally on said table, a cradle rockably mounted upon said carrier, to rock about an axis slanting to the grinder, a work-holder carried by said cradle for arcuate movement on an axis transverse to the axis of movement of said cradle, a cam plate mounted on said table connected for operation of said carrier, a shaft journalled on said carrier, cams carried by said shaft having effective surfaces formed to actuate respectively said cradle and said work-holder, a connection between said cam plate and said shaft, and means for actuating said cam plate and shaft to effect a sequential movement of said carrier, said cradle and said work-holder, all of said movements being accomplished by a continuing movement of said actuating means.

3. A grinding machine, embodying a bed, a rotatable grinder mounted thereon and a mechanism for supporting a drill or similar work in the performance of a grinding operation, said mechanism including a slideway, a plate adjustable on said slideway, a table adjustably movable along said plate, a carrier movable longitudinally of said table, a cradle rockably mounted upon said carrier, a work clamp mounted on said cradle for arcuate movement on an axis transverse to the axis of movement of said cradle, a cam plate mounted on said table for shifting said carrier, a shaft journalled on said carrier, cams carried by said shaft having effective surfaces formed to operate said cradle and said clamp, a connection between said cam plate and said shaft, spring means connecting said cam plate to said carrier, a spring connecting said clamp to said carrier, and means for actuating said cam plate in opposition to said spring means and said spring to effect a sequential movement of said carrier, said cradle and said clamp.

4. A grinding machine embodying a bed, a rotatable grinder mounted thereon and a mechanism for supporting a drill or similar work for the performance of a grinding operation, said mechanism including a slideway pivotally connected to said bed for rotary adjustment relative thereto, a sideplate laterally adjustable on said slideway, a table slidably adjustable longitudinally along said plate, a carrier movable longitudinally of said table, a cradle rockably mounted upon said carrier, a work clamp carried by said cradle for arcuate movement on an axis transverse to the axis of movement of said cradle, a cam plate mounted on said table for shifting said carrier, a shaft journalled on said carrier, cams carried by said shaft having effective surfaces formed to operate respectively said cradle and said clamp, a connection between said cam plate and said shaft and means for actuating said cam plate to effect a sequential movement of said carrier, said cradle and said clamp, all of said movements being accomplished by a continuing movement of said actuating means.

5. A grinding machine embodying a bed, a rotatable grinding implement mounted thereon and a mechanism supporting a piece of work in the performance of a grinding operation, said mechanism including a work-holding element comprising a frame, a pair of jaw members mounted within said frame, one of said jaw members being pivotally connected to said frame, a member freely supported upon said frame in superposed relation to said jaw members, a pair of arms fulcrumed in said superposed member, one of said arms being pivotally connected to each of said jaw members, a screw carried by said superposed member and means operable upon said screw for engaging said arms to effect a positive movement of said jaw members into work-holding position.

6. In a mechanism for supporting a piece of work in the performance of a grinding operation or the like thereon, a carrier adapted for movement toward and from the operation performing element, a work-holding rocker embodying a frame hinged to said carrier for arcuate movement through a vertical plane, work-clamping means carried by said frame comprising a pair of members having inclined registering surfaces forming work-engaging jaws, said members being mounted in said frame for relative movement on an axis intersecting the axis of movement of said frame, means for actuating said members toward each other for clamping a piece of work between said jaws and means supported in longitudinally spaced relationship to said jaws, for engaging another part of the work clamped within said jaws.

7. In a mechanism for supporting a piece of work in the performance of a grinding operation or the like thereon, a carrier adapted for movement toward and from the operation performing element, a work-holding device embodying a frame hinged to said carrier for arcuate movement through a vertical plane, work-clamping means carried by said frame comprising a pair of members having inclined registering jaw-forming surfaces, one of said members being pivoted to said frame for movement on an axis intersecting the axis of movement of said frame, means for actuating said members toward each other for clamping a piece of work between said jaws and means supported from said frame for adjustment longitudinally of a piece of work held between said jaws to cooperate with the latter for maintaining the work in a predetermined position for the operation thereon.

8. In a work-holding device of a grinding machine having a frame, a pair of work-engaging elements comprising relatively oppositely reciprocable members mounted within said frame and provided with a plurality of inclined surfaces defining angular protuberant portions and recesses, the protuberances of one member being adapted to enter the recesses of the other, one of said members being pivoted to said frame and means dependent upon said frame for effecting a positive movement of said members in opposite directions to function the registering portions to apply clamping effort to a piece of work centered therebetween.

9. In combination with a mechanism associated with a grinding element, a work support comprising a member apertured to receive a fitting and such fitting, the same embodying a threaded hub portion, a pair of arms pivotally mounted within said hub, diametrically opposite each other, said arms having threaded peripheral portions and angular work-engaging surfaces offset from said threaded portions and a collar internally threaded for engagement with said hub and the threaded portions of said arms; said collar being adapted to exert pressure upon said arms to produce clamping effort on a piece of work positioned between said arms.

10. A mechanism for subjecting a drill or like work to the action of an abrasive element, comprising a supporting carrier, a cradle mounted on said carrier for rocking movement, a clamp having oppositely adjustable work-engaging jaws and rotatably connected to said cradle, a single means for causing said jaws to circumferentially engage and hold the work relatively immovable therebetween, means for initially adjusting said supporting carrier relatively to the abrasive element to bring the work into a predetermined spaced relationship therewith, and a manually actuatable device operable in a single continuing movement, to sequentially urge said carrier toward said abrasive element, rock said cradle relatively thereto and turn said clamp on its rotatable connection to said cradle, the movements of the cradle and clamp occurring with the work in contact with said abrasive element.

11. A mechanism for subjecting a drill or like piece of work to the action of an abrasive element, comprising a carrier, a cradle mounted on said carrier for relative rocking movement, a clamp comprising relatively adjustable jaws for clampingly engaging the work supported by said cradle, said clamp fitted for rotative movement relatively to said carrier, means for initially adjusting said carrier relatively to the abrasive element to bring the work into a predetermined spaced relationship therewith, and a manually actuatable device, having connections to move said carrier toward said abrasive element, rock said cradle relatively thereto and rotate said clamp relatively to said cradle, in sequence, in response to a single continuing movement of said device, the movements of the cradle and the clamp occurring with the work in contact with said abrasive element.

12. A mechanism for subjecting a twist drill or the like to the action of an abrasive element, comprising an under support, a carrier slidably mounted thereupon for movement toward and from said abrasive element, a cradle or rocker mounted on said carrier for relative rocking movement, a work clamp comprising work-engaging elements and mounted on said cradle for relative rotative movement, a manually actuatable device mounted upon said under support and having connections for shifting said slidable carrier and mechanism adapted to function in coordination with the actuation of said carrier, whereby a single continuing movement of said device in one actuation will shift said slidable carrier towards said abrasive element and sequentially rock said cradle relatively to said carrier and turn said work-engaging clamp relative to said cradle, the movements of the cradle and clamp occurring with the work in contact with said abrasive element.

13. An apparatus for subjecting a drill to the action of an abrasive element, including a bed, a carrier slidable thereon, a cradle mounted above said carrier for rocking movement, a clamp comprising oppositely adjustable jaws adapted to circumferentially engage a drill in a zone intermediate its ends to hold said drill relatively immovable therebetween, said clamp being capable of rotative movement relative to said cradle, mechanism for effecting relative independent rocking movement of said cradle and rotative movement of said clamp in coordination with the movement of said carrier, a member for applying thrust to slide to said support, and means for actuating said member to urge said support toward the abrasive element and having connections to sequentially effect rocking movement of said cradle and turning of said clamp.

14. In a machine for grinding twist drills and the like, having a rotatable grind wheel presenting a grinding face to the drill, mechanism for presenting the drill to the grind wheel, comprising a table or under support initially adjustable to position the drill in near relation to the wheel face, a carrier or slide mounted on the table and movable relatively toward and from the wheel, a cradle or rocker mounted on the carrier to rock on an axis at about 31° to the wheel face, a drill clamp or holder mounted on the cradle to swing or rotate on an axis at about 59° to the wheel face, and having means to close its jaws upon the drill to hold the drill in a predetermined initial position at about 59° to the wheel face, an operating lever or actuator on said table, a connection operable by the throw of the lever to move the carrier upon the table toward the wheel, and so to cause the drill to bear against the wheel face, a connection operable by the throw of the lever to rock the cradle upon the carrier and thus tilt the drill during grinding, and a connection operable by the throw of the lever to swing the clamp and thus turn the drill during grinding, said connections being so coordinated and timed that by a single throw of the lever the drill is first advanced to the wheel face and then while pressed against the wheel face is rocked by the cradle and turned by the clamp, thereby to grind an effective contour of twist drill surface with cutting-edge-angle about 59° and suitable clearance angle.

15. In a machine for grinding twist drills and the like, having a rotatable grind wheel presenting a grinding face to the drill, mechanism for presenting the drill to the grind wheel, comprising a table or under support initially adjustable to position the drill in near relation to the wheel face, a carrier or slide mounted on the table and movable relatively toward and from the wheel, a cradle or rocker mounted on the carrier to rock on an axis at a slanting angle to the wheel face, a drill clamp or holder mounted on the cradle to swing or rotate on an axis at a slanting angle to the wheel face different from the rocking axis of said cradle, and at an opposite slant, said clamp having a device to close its jaws upon the drill to hold the drill in a predetermined initial position at a slanting angle to the wheel face, an operating lever or actuator mounted to be manually thrown, a means operable by the throw of the lever to move the carrier toward the wheel, and so to cause the drill to bear against the wheel face, a means operable by the throw of the lever to cause rocking of the cradle and thus to tilt the drill during grinding, and a means operable by the throw of the lever to cause swinging of the clamp and thus to turn the drill during grinding, said three means being so coordinated that by a single throw of the lever the drill is advanced to the wheel face and then while pressed against the wheel face is both rocked by the cradle and turned by the clamp, thereby to grind an effective contour of twist drill surface.

16. In a machine for grinding twist drills and the like, having a rotatable grind wheel presenting a grinding face to the drill, mechanism for presenting the drill to the grind wheel, comprising a carrier or slide movable relatively toward and from the wheel, a cradle or rocker mounted to rock on the carrier about an axis slanting to the wheel face, a drill clamp or holder mounted to rotate on the cradle about an axis slanting to the wheel face namely at an angle thereto approximately equalling the cutting-edge-angle of the drill, 59° more or less, said clamp adapted to hold the drill in a predetermined initial position at said cutting-edge-angle to the wheel face, and the axis of cradle rocking being substantially at right angles to such initial position of the drill, an operating lever or actuator and connections operable by the throw of the lever (1) to move the carrier toward the wheel and so to cause the drill to bear against the wheel face, and (2) to cause the rocking of the cradle and thus tilting of the drill during grinding, and (3) to cause the swinging of the clamp and thus turning of the drill during grinding, said connections being so timed that by a single throw of the lever the drill is advanced to the wheel face and then while pressed against the wheel face is rocked by the cradle and turned by the clamp, thereby to grind an effective contour of twist drill surface with suitable cutting-edge and clearance angles.

17. In a machine for grinding twist drills and the like, having a rotatable grind wheel presenting a grinding face to the drill, mechanism for presenting the drill to the grind wheel, comprising a carrier slidable relatively toward and from the wheel, a rocker carried by the carrier and mounted to rock about an axis slanting to the wheel face, a drill holder carried by the rocker and mounted to rotate thereon about an axis having a slant to the wheel face opposite to that of the axis of rocking of said rocker, said holder having means to hold the drill at a slanting angle to the wheel face, an operating lever, and connections operable by the throw of the lever to move the carrier toward the wheel and cause the drill to bear against the wheel face, also to rock the rocker and thus tilt the drill during grinding, also to swing the holder and thus turn the drill during grinding, said connections being so timed that by a single throw of the lever the drill is advanced to the wheel face and while pressed against the wheel face is simultaneously rocked by the rocker and turned by the holder, about said axes.

18. In a machine for grinding twist drills and the like, having a rotatable grind wheel presenting a grinding face to the drill, mechanism for presenting the drill to the grind wheel, comprising a carrier bodily shiftable toward and from the wheel, a rocker wholly carried by the carrier and mounted thereon to rock about a predetermined axis slanting to the wheel face, a drill holder wholly carried by the rocker and mounted to rotate thereon about a predetermined axis having a slant to the wheel face opposite to that of the axis of rocking of said rocker, said holder having means to hold the drill at a slanting angle to the wheel face substantially the same as that of the axis of rotation of the holder, an operating member, and connections operable by the operation of the operating member to move the carrier toward the wheel and cause the drill to bear against the wheel face, also to rock the rocker and thus tilt the drill during grinding, also to swing the holder and thus turn the drill during grinding, said connections being so timed that by a single continuous operation of said member the drill is advanced to the wheel face and while thereby pressed against the wheel face is simultaneously rocked by the rocker and turned by the holder, about said axes.

ROBERT C. WEISHAMPEL.